United States Patent Office 3,520,700
Patented July 14, 1970

3,520,700
PROCESS FOR THE PASTEURIZATION OF EGG WHITES
Willibald F. Kohl, Yonkers, and John C. Sourby, Hawthorne, N.Y., and Rudolph H. Ellinger, New Canaan, Conn., assignors to Stauffer Chemical Company, New York, N.Y., a corporation of Delaware
No Drawing. Filed Jan. 2, 1968, Ser. No. 694,797
Int. Cl. A23b 5/00
U.S. Cl. 99—161                                    9 Claims

ABSTRACT OF THE DISCLOSURE

A process of pasteurizing egg whites which consists of dissolving within said egg whites a food grade alkali polyphosphate material in an amount ranging between 0.20 and 2.0% weight. The pH of the egg whites is then adjusted to a range of between about 8.0 and 10.0. The egg whites are then heated to a pasteurization temperature for a sufficient length of time to pasteurize the egg whites.

BACKGROUND OF THE INVENTION

There are a number of food poisoning microorganisms that cause serious problems in the food industry. Among these different spoilage organisms which may contaminate these different spoilage organisms which may contaminate foodstuff, the group Salmonellae have gained special importance. Salmonellae are pathogenic gram-negative rod-like bacteria that have drawn much recent attention that is well documented in the literature. Of the several food areas involved, particular interest has been generated in the reduction of Salmonellae in egg products. The contents of an egg with unbroken shell may already contain bacteria caused by the infection of a laying hen. The exterior surface of the egg may be contaminated with bacteria from the intestinal tract of the hen, from the nest or from other material contacted after laying. Some of these can be introduced into egg products during breaking operations. Bacteria can also penetrate the shell from outside. The invading microorganisms infect the egg and can be carried on into a variety of egg products.

The elimination of Salmonellae by pasteurization of egg products hae become mandatory under United States Department of Agriculture regulations. According to these regulations all egg products have to be pasteurized regardless of whether they are to be distributed in frozen, liquid or dried form.

There are problems in pasteurization that are peculiar to egg whites as compared to whole eggs or yolks. All pasteurization processes for egg whites must be a compromise between the amount of heat applied to kill Salmonellae and the coagulation of the egg proteins, which effect the functional properties thereof. Although naturally occurring levels of Salmonellae are seldom greater than 100 per milliliter of egg product, present processes have need of improvement to minimize undesirable effects on functional properties or excessive build-up on plant equipment. Present processes also lack retained inhibitory effects after pasteurization.

At present, there exist several processes which give acceptable destruction of Salmonellae in egg whites. One of these processes is described and claimed in U.S. Pat. No. 3,251,697, which involves the addition of a food grade acid to lower the pH of the egg whites from about 9.0 to about 7.0, and with the addition of aluminum or other metal ions to stabilize the egg proteins against coagulation at higher temperatures. These materials may be added to give a concentration of 30 parts per million as aluminum, added in the form of aluminum sulfate and 0.15% lactic acid in the egg whites. The egg whites may then be pasteurized at a temperature of 140 to 143° F., at a holding time of 3.5 minutes. This procedure is reported to destroy one million added Salmonellae per milliliter. However, it has been found in practice that the bacterial count in this process is relatively high after treatment. Also, the aluminum sulfate in the egg whites will cause the appearance of small particles of precipitated egg proteins.

Another proposed solution to killing the bacteria within the egg whites is described and claimed in U.S. Pat. No. 2,776,214. This process involves taking the egg white at its normal pH, heating it to 100° to 130° F. for a period of 0.5 to 5 minutes. This is claimed to largely inactivate the indigenous catalase. Thereafter, sufficient hydrogen peroxide solution is metered in to give a concentration of 0.1% peroxide in the egg whites. The egg whites are then reheated and then they are cooled and catalase is added to destroy the residual peroxide. This process is reported to produce sterile egg white. This process has a serious drawback because a relatively high amount of bacteria may survive the pasteurization process when heat resistant bacteria strains are present in the egg whites.

BRIEF DESCRIPTION OF THE INVENTION

It has been discovered that the Salmonellae within egg whites can be materially reduced by treating the egg whites with a synergistic combination of polyphosphate and an alkaline donating material to adjust the pH of the natural egg whites to between 8.0 and 10.0. Thereafter, the egg whites are pasteurized at a temperature of between 125° to 135° F., depending on the pH of the egg whites, for a period of from 0.5 to 10 minutes holding time.

DETAILED DESCRIPTION OF THE INVENTION

In the practice of the present invention, the liquid egg whites are separated from the yolks in a conventional manner. Thereafter, an alkali containing polyphosphate is added thereto in an amount ranging from 0.20 to about 2.0 percent by weight. The alkali containing polyphosphates can be represented by the formula $(NaPO_3)_n$ wherein $n$ can range between 3 to 40. The polyphosphates represented by this formula can be linear or cyclic and can be coupled to $H_2O$ or $Na_2O$. Specific examples of a polyphosphate that can be employed with the present invention can include sodium hexametaphosphate, sodium tetrapolyphosphate, sodium tripolyphosphate, sodium hexapolyphosphate, sodium heptapolyphosphate, sodium octapolyphosphate and the like.

After the polyphosphate material has been dissolved within the egg whites, an alkaline containing material is added thereto to adjust the pH to between 8.0 and 10.0, preferably between 8.5 and 9.5. The alkaline containing material may be selected from the group consisting of sodium hydroxide, potassium hydroxide, ammonium hydroxide, sodium phosphate, calcium hydroxide, sodium carbonate, and the like.

When the pH of the material has been determined to be between 8.5 and 10.0, the egg whites are then pasteurized at a temperature of between 125° F. and 135° F. The exact temperature of pasteurization of course will depend on the pH of the egg whites. It has been found in practice that the holding time of the egg whites during pasteurization should be from 0.5 to 10 minutes. After the egg whites have been pasteurized, they are cooled. The pH is adjusted to the original level and then they are placed in storage in a conventional manner.

In the practice of the present invention, it has been found that the combination of the polyphosphate materials with the alkaline containing material provides considerable residual killing power for bacteria. Thus, on aging, the egg whites as processed by the present invention will be provided with much fewer bacteria than the conventionally processed egg whites.

In order to illustrate the merits of the present invention, the following examples are provided:

Example 1

Egg whites were obtained from fresh eggs by separation thereof from the yolks and mixed to form a uniform batch. Then, a bacterial culture of *Salmonellae senftenberg* 775W was added to provide a concentration thereof of 7.2 millions per milliliter. Thereafter, 0.75% by weight of sodium hexametaphosphate was dissolved therein. The pH of the egg whites was raised to 9.4 by employing an alkaline agent, trisodium orthophosphate. The egg whites were then subjected to a pasteurization temperature of 135° F. for five minutes holding time. The egg whites were then cooled to 38° F. The egg whites were then assayed for surviving Salmonellae using standard microbiological procedures. It was determined that the samples were Salmonellae negative.

Example 2

The procedure of Example 1 was repeated in its entirety except no sodium hexametaphosphate or trisodium orthophosphates were added thereto. Under these conditions, without additives, the average number of surviving Salmonellae was assayed to be 12,000 per milliliter.

Example 3

Egg whites were obtained in the same manner as set forth in Example 1. A bacterial culture of *Salmonellae senftenberg* 775W was added to provide a concentration thereof of 7600 per milliliter. Then, 0.5% by weight of sodium polyphosphate with an average chain length of 25 was added. Then, a 10% sodium hydroxide solution was added thereto to raise the pH of the egg whites to 9.2. The egg whites were then pasteurized at a temperature of 125° F. for five minutes holding time. After pasteurization, the egg whites were cooled quickly to 40° F. and assayed for Salmonellae by standard microbiological procedures. The assay showed the samples to be Salmonellae negative.

Example 4

The procedure as set forth in Example 3 was repeated in its entirety except no sodium polyphosphate or sodium hydroxide was added thereto. After the pasteurization procedure as outlined in Example 3 was completed, an assay of the egg whites indicated a survival of 1160 Salmonellae per milliliter within the egg whites.

Example 5

Egg whites were obtained in a manner as set forth in Example 1. A bacterial culture of *Salmonellae typhimurium* was added thereto to provide a concentration thereof of 2.4 millions per milliliter. Then, 0.5% by weight sodium hexametaphosphate was dissolved therein. Thereafter, a 10% solution of sodium hydroxide was added to raise the pH of the egg whites to 9.5. The egg whites were then pasteurized at a temperature of 130° F. for five minutes holding time. An assay of the egg whites using standard microbiological procedures showed the samples to be Salmonellae negative.

Example 6

The procedure as set forth in Example 5 was repeated in its entirety except no sodium hexametaphosphate or sodium hydroxide were added to the egg whites. After the pasteurization of the egg whites, an assay indicated that 11,000 Salmonellae survived the pasteurization process.

Example 7

Egg whites were obtained from fresh eggs in a commercial continuous operation. The egg whites were assayed for their total bacterial flora count by using standard microbiological procedures. The concentration thereof was 16,500 per milliliter. To a portion of these egg whites was added 0.5% by weight sodium hexametaphosphate followed by dropwise addition of a 10% solution of sodium hydroxide to raise the pH of the egg whites to 9.5. The egg whites with these additives were pasteurized at a temperature of 130° F. for five minutes holding time. The pasteurized egg whites contained an average of 500 bacteria flora per milliliter. However, the samples were Salmonellae negative. The pasteurized eggs were kept at 77° F. room temperature, for three days. The total bacterial flora count was checked daily. It was found that the bacterial flora count decreased gradually. The average number of bacterial flora were 330 per milliliter after one day, 270 per milliliter after two days, and 160 per milliliter after three days. These results show a lasting inhibitory effect upon bacterial flora in egg whites after pasteurization. It is apparent that the combination of 0.5% sodium hexametaphosphate plus an alkali to raise the pH to 9.5 causes the total bacterial flora count of the egg whites to decrease materially during pasteurization and causes the residual bacterial flora to diminish with storage at room temperature.

Example 8

A standard stabilizer solution, composed of aluminum sulfate and lactic acid, was added to the remaining egg white of Example 7 in an amount of 0.6% by weight. The egg whites were then pasteurized at 142° F. for 3.5 minutes. An assay of the egg whites after pasteurization employing standard microbiological procedures indicated 2500 bacterial flora per milliliter survived from the 16,500 per milliliter initially present. After standing at room temperature, the number of bacterial flora increased.

Example 9

Egg whites were obtained from a commercial continuous breaking operation. An assay of the egg whites indicated the presence of 16,500 bacterial flora per milliliter. The egg whites were then separated into six equal portions. The following additives were added to each portion:

(1) 0.5% sodium hexametaphosphate plus a 10% solution of sodium hydroxide to give a pH of 9.5;
(2) 1.0% sodium hexametaphosphate plus a 10% sodium hydroxide solution to give a pH of 9.5;
(3) A 10% solution of sodium hydroxide alone to give a pH of 9.5;
(4) 0.1% hydrogen peroxide followed by addition of catalase after ten minutes;
(5) 0.6% stabilizer solution consisting of aluminum sulfate dissolved in lactic acid, to provide a pH in the egg whites of 7.0;
(6) No additives added. The pH determined to be 8.9.

The effectiveness of the additives in the egg whites towards the natural bacterial flora was tested. The egg whites were stored at 25° C. for three days. In daily intervals the standard bacterial plate count was determined. The results of these plate counts are tabulated as follows:

STANDARD BACTERIAL COUNT (per ml.)

| No. | Initial bacterial count in egg whites | After 24 hours at 25° C. | After 48 hours at 25° C. | After 72 hours at 25° C. |
|---|---|---|---|---|
| 1 | $1.65 \times 10^4$ | $2.1 \times 10^3$ | $8.6 \times 10^2$ | $9.4 \times 10^2$ |
| 2 | $1.65 \times 10^4$ | $1.6 \times 10^3$ | $8.1 \times 10^2$ | $6.0 \times 10^2$ |
| 3 | $1.65 \times 10^4$ | $3.1 \times 10^4$ | $1.4 \times 10^5$ | $4.2 \times 10^5$ |
| 4 | $1.65 \times 10^4$ | $3.7 \times 10^4$ | $2.9 \times 10^5$ | $1.0 \times 10^6$ |
| 5 | $1.65 \times 10^4$ | $1.0 \times 10^7$ | $2.0 \times 10^8$ | $2.0 \times 10^8$ |
| 6 | $1.65 \times 10^4$ | $5.2 \times 10^4$ | $6.8 \times 10^6$ | $8.7 \times 10^7$ |

Example 10

The pasteurized egg whites of Example 1 were tested for any indication of an alteration of the functional properties. Accordingly, 176 grams of the egg whites were mixed with a kitchen style mixer for 90 seconds.

The amount of foam thus generated was then measured. The quantity of foam produced is a measure of the degree of protein denaturization that may occur during pasteurization. The amount of foam produced by the egg whites in 90 seconds is inversely proportional to the amount of protein denaturized during pasteurization. The volume of foam produced under these conditions is reported as specific volume determined by dividing the total amount of foam generated in milliliters, by the weight of the egg whites in grams. Thus, a specific volume of less than 3 indicates an excess of denaturization of the egg whites that is undesirable. However, the egg whites treated as set forth above had a specific volume of over 6. After the specific volume of the egg whites had been measured, the baking performance thereof was measured by preparing angel food cakes from the pasteurized egg whites. Thus, the 176 grams of egg whites were beat for an additional two minutes with the kitchen style mixer. Thereafter, 2.45 grams of cream of tartar, 0.70 gram of salt, and 84.0 grams of sugar were added. The mixture was then blended for an additional two minutes. Then, a blend consisting of 42 grams of flour and 45 grams of sugar was folded into the whipped egg whites. The resulting batter was placed in six inch pans and baked for thirty minutes at 355° F. After baking, the volume of the cakes were measured by standard seed displacement techniques. The specific volumes were determined by dividing the weight of the cakes in grams into the total volume. A specific volume greater than 3 is indicative of acceptable egg white functional properties. In this instance, the specific volume was 4.3. Any changes in opacity of the egg whites due to pasteurization was measured by visual observation. An increase in opacity or the formation of solid protein particles is indicative of protein denaturization. The egg whites pasteurized in accordance with this invention were clear.

What is claimed is:

1. The process for pasteurizing egg whites comprising the steps of:
    (a) adding a food grade alkali polyphosphate in an amount ranging from between 0.2 to about 2.0% by weight to said egg whites;
    (b) adjusting the pH of said egg whites to between about 8.0 and 10.0 with an alkaline material;
    (c) heating said egg whites to a pasteurization temperature for a sufficient length of time to pasteurize the said egg whites.

2. The process as set forth in claim 1, wherein said alkali polyphosphate can be represented by the formula:

$$(NaPO_3)_n$$

wherein $n$ can range between about 3 and 40 and wherein said polyphosphate can be linear or cyclic and can be coupled to $H_2O$ or $Na_2O$.

3. The process as set forth in claim 2, wherein said polyphosphate alkali polyphosphate materials can be selected from the groups consisting of sodium hexametaphosphate, sodium tetrapolyphosphate, sodium tripolyphosphate, sodium hexapolyphosphate, sodium heptapolyphosphate, sodium octapolyphosphate, and mixtures thereof.

4. The process as set forth in claim 1, wherein said alkali material may be selected from the group consisting of sodium hydroxide, potassium hydroxide, ammonium hydroxide, sodium phosphate, calcium hydroxide, sodium carbonate and mixtures thereof.

5. The process as set forth in claim 1, wherein said pasteurization temperature can range between 125° F. and 135° F.

6. The process as set forth in claim 1, wherein said pasteurization temperature is held for a period of from 0.5 to 10 minutes.

7. The process as set forth in claim 1, wherein said alkali polyphosphate material can be represented by the formula:

$$(NaPO_3)_n$$

wherein $n$ can range between 3 and 40 and can be linear or cyclic and can be coupled to $H_2O$ or $Na_2O$ and can be selected from the group consisting of sodium hexametaphosphate, sodium tetrapolyphosphate, sodium tripolyphosphate, sodium hexapolyphosphate, sodium heptapolyphosphate, sodium octapolyphosphate, and mixtures thereof, and can be present in an amount ranging between 0.20 to about 2.0% by weight.

8. The process as set forth in claim 7, wherein said alkaline material can be selected from the group consisting of sodium hydroxide, potassium hydroxide, ammonium hydroxide, sodium phosphate, calcium hydroxide, sodium carbonate, and mixtures thereof, and wherein said pasteurization temperature can range between 125° F. and 135° F. for a period of from 0.5 to 10 minutes.

9. The process as set forth in claim 1, together with the additional steps of cooling said pasteurized egg whites and readjusting the pH thereof to the natural level with a food grade acid.

References Cited

UNITED STATES PATENTS

| | | | |
|---|---|---|---|
| 2,445,879 | 7/1948 | Hall | 99—210 |
| 2,752,248 | 6/1956 | Blick et al. | 99—113 |
| 2,929,715 | 3/1960 | Sutton | 99—14 |
| 3,328,175 | 6/1967 | Cunningham et al. | 99—113 |

A. LOUIS MONACELL, Primary Examiner

W. BOVEE, Assistant Examiner

U.S. Cl. X.R.

99—113, 211